United States Patent [19]

Lindros, Jr.

[11] Patent Number: 5,005,313
[45] Date of Patent: * Apr. 9, 1991

[54] ANIMAL TRAP

[76] Inventor: Chester A. Lindros, Jr., 335 Woodruff Ave., Avenel, N.J. 07001

[*] Notice: The portion of the term of this patent subsequent to Aug. 21, 2007 has been disclaimed.

[21] Appl. No.: 519,427

[22] Filed: May 4, 1990

Related U.S. Application Data

[63] Continuation-in-part of Ser. No. 359,639, May 30, 1989, Pat. No. 4,949,499.

[51] Int. Cl.$^5$ .............................................. A01M 23/02
[52] U.S. Cl. ........................................... 43/61; 43/67; 43/12
[58] Field of Search ................................. 43/61, 62, 67

[56] References Cited

U.S. PATENT DOCUMENTS

| 4,231,180 | 11/1980 | Bare | 43/61 |
| 4,291,486 | 9/1981 | Lindley | 43/62 |
| 4,446,646 | 5/1984 | Van't Veld | 43/12 |
| 4,769,942 | 9/1988 | Copenhaver, Sr. | 43/61 |

Primary Examiner—Richard K. Seidel
Assistant Examiner—Rex E. Pelto
Attorney, Agent, or Firm—Ezra Sutton

[57] ABSTRACT

An animal trap having two housings slideable relative to each other to trap an animal therein. Removal of the bait by the animal causes the inner housing to slide into the outer housing and seal the trap with the animal therein.

6 Claims, 1 Drawing Sheet

ANIMAL TRAP

FIELD OF THE INVENTION

The present invention relates generally to animal traps and more particularly to such traps being inexpensive and simple to manufacture and use. The present application is a continuation-in-part of U.S. patent application Ser. No. 359,639, filed May 30, 1989, now U.S. Pat. No. 4,949,499

BACKGROUND OF THE INVENTION

Many animal traps have been developed in the past for trapping and disposing of mice, rats, and the like. For example, U.S. Pat. No. 3,591,972 discloses a device which is expensive and complex. In addition, most such traps do not have the attributes of being simple to use and manufacture, inexpensive, and easy to clean.

Accordingly, it is an object of the present invention to provide an improved animal trap which is simple to use, easy to manufacture, inexpensive, and easy to clean, and generally overcomes the drawbacks of prior art devices.

SUMMARY OF THE INVENTION

In accordance with the present invention, there is provided an animal trap having an outer housing, an inner housing mounted within and movable relative to the outer housing to define a trapping area, at least one trap opening in the inner housing for an animal to enter the trapping area, a device for moving the inner housing into the outer housing to close off the trap opening to trap an animal in the trapping area and a bait device for holding the trap opening in an open position, so that when an animal in the trapping area eats the bait device, the inner housing is moved into the outer housing to close off the trap opening to trap the animal in the trapping area.

In the preferred embodiment, the inner and outer housings are cylindrical in shape and are formed of plastic material, but they can also be formed of mesh material, depending on what type of animal is being trapped.

BRIEF DESCRIPTION OF THE DRAWINGS

Further objects, features, and advantages of the present invention will become apparent upon consideration of the detailed description of the presently-preferred embodiment, when taken in conjunction with the accompanying drawings wherein.

DETAILED DESCRIPTION OF PREFERRED EMBODIMENT

Figure 1:
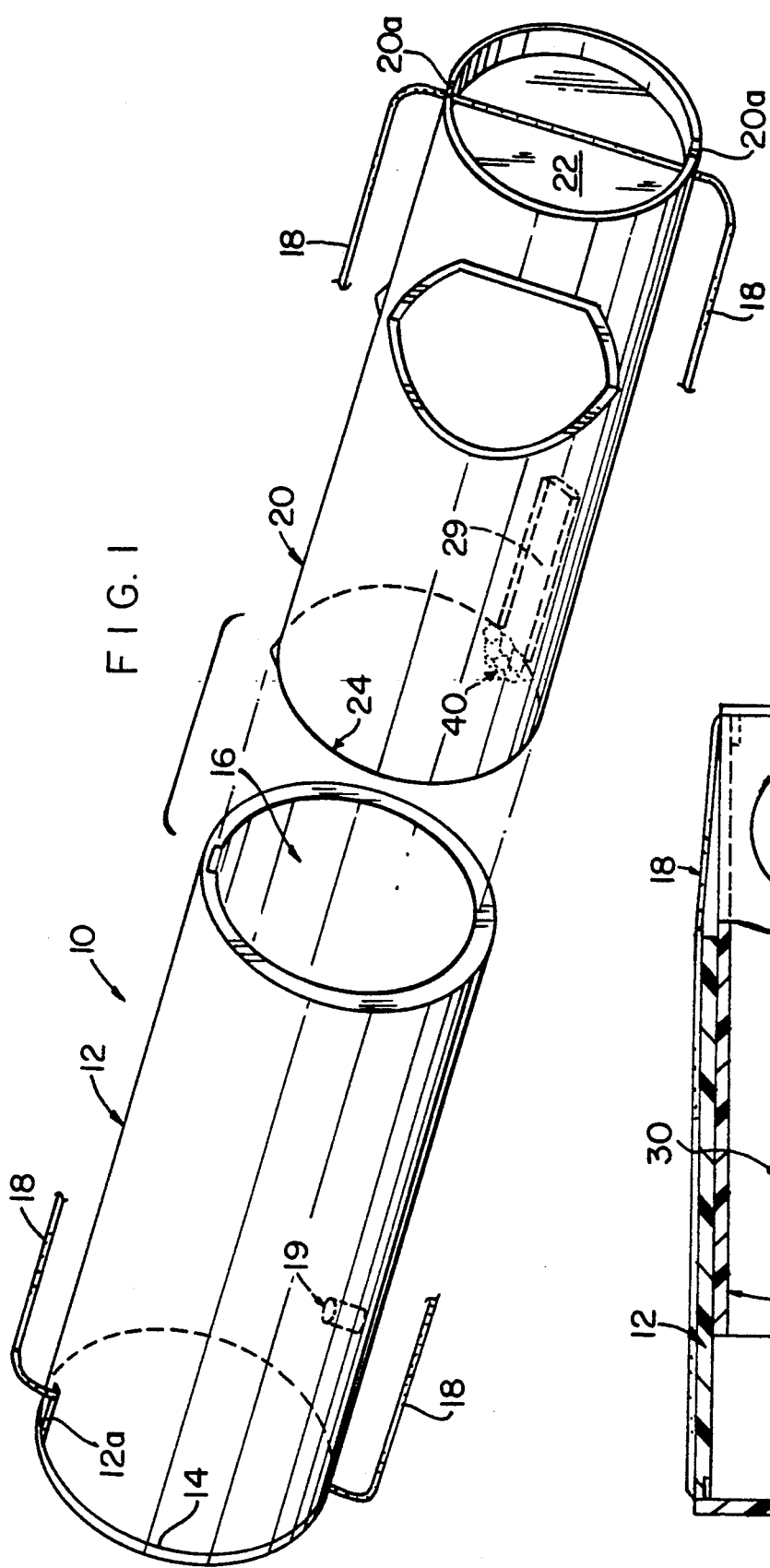
FIG. 1 is a perspective view of the inner and outer housings separated from each other and with the inner housing ready to slide into the outer housing.

In FIG. 1 there is shown the animal trap 10 which includes an outer housing 12 having a closed end 14 and an open end 16, with the housing having a generally-cylindrical configuration. In addition, slits 12a are formed in the outer housing 12 to receive an elastic band 18, for a purpose to be described. Housing 12 includes an upstanding pin 19 mounted on the inside wall of housing 12.

In addition, animal trap 10 includes an inner housing 20 having a closed end 22 and an open end 24. The inner housing 20 includes slits 20a for receiving elastic band 18, for a purpose to be described. The inner housing 20 includes a trap opening 26 on one side of the housing and a similar opening 28 on the opposite side of the housing. Housing 20 includes an elongated slot 29 which is aligned to cooperate with pin 19.

Figure 2:
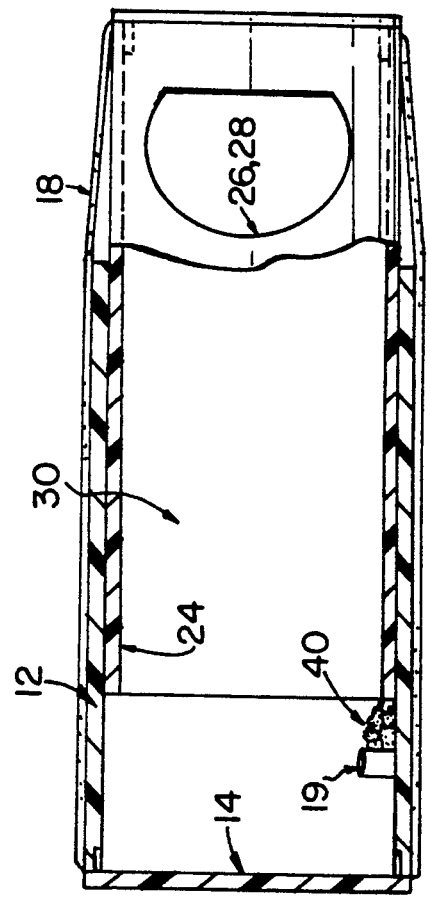
FIG. 2 shows in cross section the bait device holding the inner housing in a position to maintain the trap opening in its open position, and just prior to an animal eating the bait.

The inner housing is positioned and sized to be mounted within and slideable relative to the outer housing 20 to define a trapping area 30, as shown in FIG. 2, within the inner and outer housings 12, 20.

A device is provided for moving the inner housing 20 into the outer housing 12 to close off the trap openings 26 and 28 to thereby trap an animal in the trapping area 30.

The moving device can be made of any suitable material, and in the preferred embodiment herein, the moving device is shown to be an elastic band 18, which applies pressure to push the inner housing into the outer housing against a bait device 40. More particularly, bait device 40 is placed in the animal trap when it is set and is placed between pin 19 and slot 29. In setting the animal trap, the bait device 40 is set between these two members to hold the inner housing in an open position so that trap openings 26 and 28 are opened and uncovered by the outer housing 12. In this manner, an animal can enter through the trap openings 26 and 28 and enter into the trapping area 30 and be led to the bait device 40, which is holding the trap openings 26 and 28 in their open positions.

In this manner, when an animal in the trapping area 30 eats the bait 40, it no longer operates to hold the inner housing in its open position. As a result, the moving device or elastic band 18 moves pin 19 along slot 29, so the inner housing 20 moves into the outer housing 12 to close off the trap openings 26, 28 and thereby trap an animal in the trapping area 30.

It should be understood that in accordance with the present invention, the inner and outer housings may be formed of any other suitable shape in addition to cylindrical, and materials other than plastic and mesh may also be used.

In accordance with the present invention, there has been provided a new and advantageous animal trap which is simple to use, easy to manufacture, and easy to clean. Once an animal is caught in the trapping area 30, it can safely be carried therein to a disposal location where inner housing 20 is slid outwardly from outer housing 12, so that the animal can be dropped out of the open end 16 of outer housing 12 and disposed of in a suitable manner.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An animal trap, comprising:
    (a) an outer housing having a closed end and an open end;
    (b) an inner housing having a closed end and an open end mounted within and movable relative to said outer housing to define a trapping area within said inner and outer housings;

(c) at least one trap opening in said inner housing for an animal to enter said trapping area;

(d) means for moving said inner housing into said outer housing to close off said trap opening to trap an animal in said trapping area;

(e) means for guiding said inner housing into said outer housing; and (f) bait means disposed in contact with said guiding means for holding said trap opening in an open position so that when an animal in said trapping area eats said bait means, said moving means moves said inner housing into said outer housing to close off said trap opening to trap an animal in said trapping area.

2. An animal trap in accordance with claim 1, wherein said inner and outer housings are cylindrical in shape and formed of plastic material.

3. An animal trap in accordance with claim 1, wherein said inner housing includes two trap openings.

4. An animal trap in accordance with claim 1, wherein said means for moving includes an elastic band.

5. An animal trap in accordance with claim 1, wherein said guiding means includes a pin and an elongated slot formed on said inner and outer housings.

6. An animal trap in accordance with claim 5, wherein said bait means is disposed between said pin and said slot for holding said trap opening in an open position.

* * * * *